Nov. 2, 1948.  W. A. PLEDGER  2,452,790
PRESSURE COOKER

Filed Sept. 29, 1945  3 Sheets-Sheet 1

INVENTOR.
WILLIAM A. PLEDGER
BY George B. White
HIS ATTORNEY

Nov. 2, 1948.  W. A. PLEDGER  2,452,790
PRESSURE COOKER
Filed Sept. 29, 1945  3 Sheets-Sheet 2

INVENTOR.
WILLIAM A. PLEDGER
BY George B. White
HIS ATTORNEY

Nov. 2, 1948. W. A. PLEDGER 2,452,790
PRESSURE COOKER
Filed Sept. 29, 1945 3 Sheets-Sheet 3
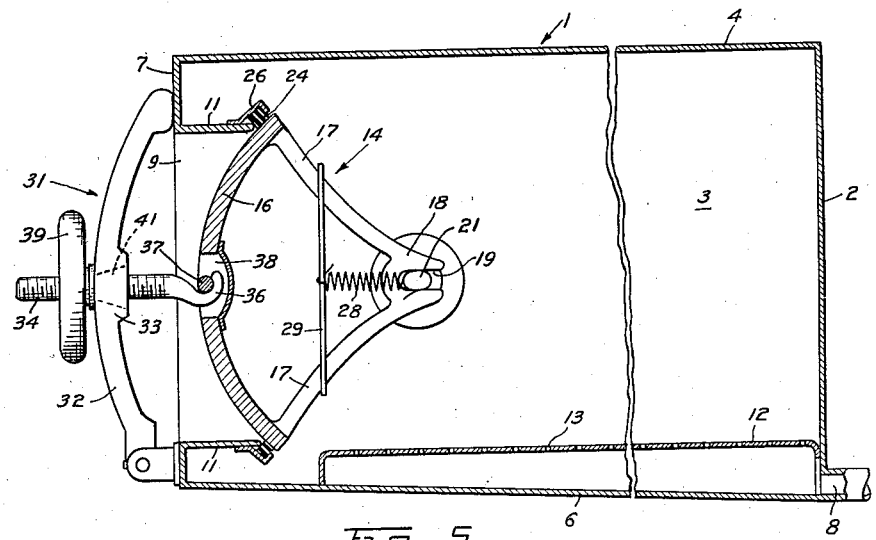
Fig. 5.
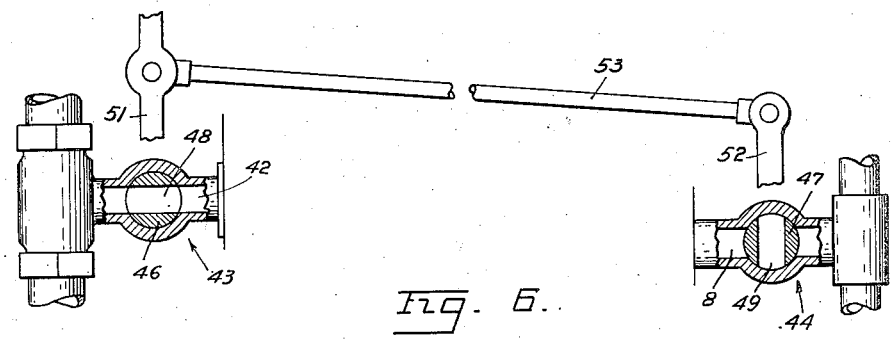
Fig. 6.
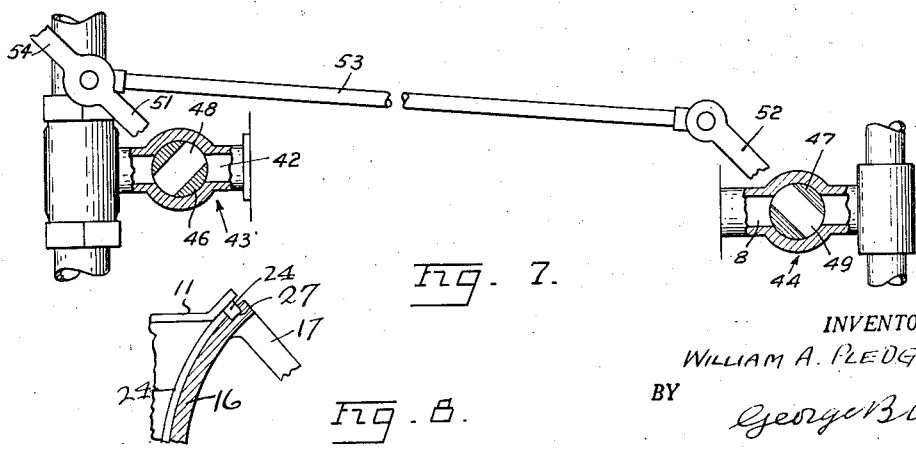
Fig. 7.
Fig. 8.
INVENTOR.
WILLIAM A. PLEDGER
BY George B. White
HIS ATTORNEY Patented Nov. 2, 1948

2,452,790

UNITED STATES PATENT OFFICE 2,452,790

PRESSURE COOKER

William A. Pledger, San Francisco, Calif.

Application September 29, 1945, Serial No. 619,324

4 Claims. (Cl. 220—25)

1

This invention relates to pressure cookers.

An object of the invention is to provide a pressure cooker with a closure, which is easily movable into open and closed positions and is held in tightly closed position by the steam pressure in the cooker.

Another object of the invention is to provide a pressure cooker in which the clamping device for the door or cover of the cooker is coordinated with a valve control mechanism in such a way that the releasing of the door by said clamp automatically shuts off the steam supply to the pressure cooker and thereby obviates any danger of scalding or injury from escaping steam.

Another object of the invention is to provide a pressure cooker in which the steam intake and exhaust mechanisms are operated in synchronism, for facilitating the expelling of air, the introduction of steam and the release of the steam from the pressure cooker.

Another object of the invention is to provide a safe and serviceable pressure cooker which may be used in single units or multiple units, which suitably receives trays or the like for the food to be cooked, and which can be easily manipulated for the pressure cooking of food or the like.

The essential features of the invention involved in the carrying out of the objects indicated are susceptible to modification, but a preferred embodiment of the invention is shown in the accompanying drawings, in which:

Fig. 5 is a sectional view of one of the pressure cookers;

Fig. 6 is a somewhat diagrammatic sectional view of the arrangement and control of the intake and exhaust valves of the cooker, showing the intake valve fully opened and the exhaust valve closed;

Fig. 7 is a partly sectional and somewhat diagrammatic view showing the connection between the intake valve and the exhaust valve of the cooker, both valves being in partially opened position, and Fig. 8 is a fragmental sectional view of a modified sealing arrangement for the door of the cooker.

Figure 1:
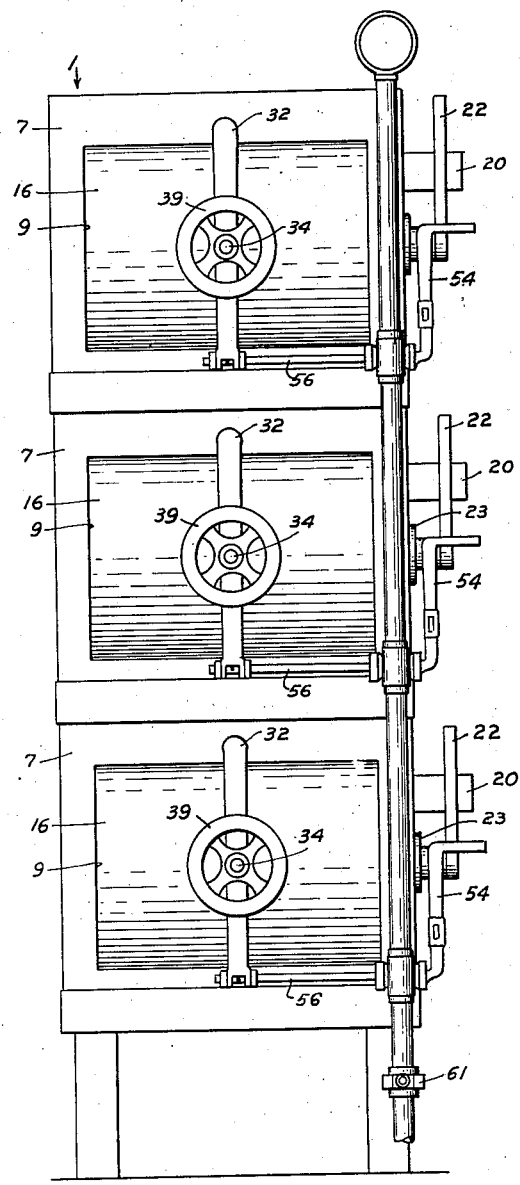
Fig. 1 is a front view of my pressure cooker arranged in multiple units.
Figure 2:
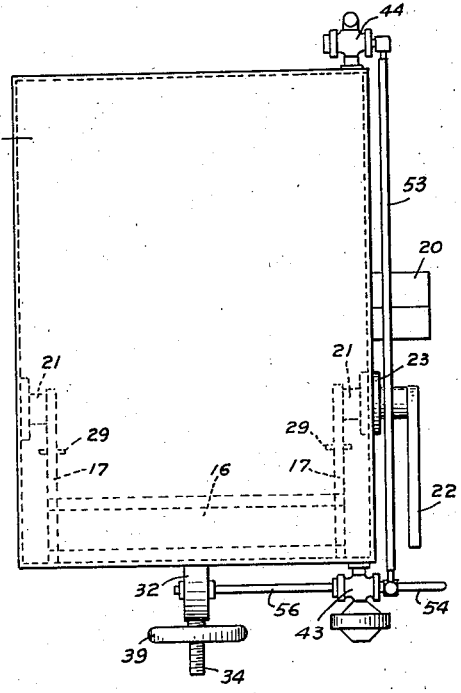
Fig. 2 is a top plane view of my pressure cooker.

In carrying out my invention I make use of a box or casing 1 which has a closed end 2, sides 3, a top 4, an inclined bottom 6 and a front 7.

2

The bottom 6 as shown is inclined from the front wall 7 toward the closed end 2 downwardly so as to drain condensed steam and the like from the casing 1 through an exhaust passage 8.

The front end 7 has an opening 9 through which the food to be processed is placed into the interior of the cooker casing 1. This opening 9 is surrounded by flanges 11 which extend around the edges of the opening 9 and into the casing 1. On the bottom 6 is provided a shelf 12 which has perforations 13 therethrough on which shelf is supported a suitable tray or vessel containing the food to be processed.

A door structure denoted in its entirety by the numeral 14 is provided for the opening 9 at the inner edges of the flanges 11 so that the door can be easily moved into and out of operative positions. The door structure includes a door 16 in the form of a segment of a cylinder. The convex side of this door 16 faces toward the opening 9. Arms 17 extend from the concave side of the door 16 at each end thereof substantially radially with respect to the arc of the door. The arms 17 at each end are united in a central hub 18 which latter is formed into an open yoke 19 straddling a stub shaft 21. This pivot shaft 21 is flat and the yoke 19 fits slidably thereover. Each shaft 21 is rounded at its outer end and is journaled in the adjacent side 3 of the casing 1. One of the shafts 21 extends through one of the walls 3 of said casing 1 and has a handle 22 on its outer end for the turning of the shaft 21 and thereby turning the yokes 19, hub 18, arms 17 and the segmental door 16. The top wall 4 of the casing 1 is at such a greater distance from the axis of the shafts 21 than the radius of the convex side of the door 16 so as to allow the swinging of the segmental door 16 to an out of way position adjacent said top wall 4. An abutment 20 on the outside of the side wall 3 adjacent the handle 22 is so located that the handle 22 rests on it when the door 16 is open and the overswinging and reversing of the door is thus obviated. The journals 23 in the walls 3 are suitably packed for preventing the escape of steam or pressure from the pressure cooker. Each yoke 19 is slidable on its shaft 21 to allow slight play or movement of the door 16 towards to and away from the opening 9.

The inner edges of the flanges 11 around the opening 9 are formed of about the same shape as the outline of the door 16. In the present illustrative embodiment the horizontal edges of the flanges 11 at the opening 9 are straight, while the vertical edges of the same are arcuate, and of the same radius as the radius of the cylindrical segment forming the door 16. In order to provide a compressible contact between the inner edges of the flanges 11 and the door 16, a compressible packing 24 is provided between the inner edges of the flanges 11 and the outer surface of the door 16. This packing 24, in the form shown in Fig. 5, is held in retainer rims 26 mounted on the flanges 11 so as to hold the packing 24 around the sides of the opening 9. In the form shown in Fig. 8 the packing strips 24 are mounted in retainer grooves 27 along the outer edges of the door 16.

The door structure 14 is adjustable radially with respect to the axis of the pivot shafts 21. In other words the yokes 19 are slidable on the shaft 21 toward and away from the opening 9. A coil spring 28 is anchored at one end thereof to the shaft 21 and at its other end to the cross bar 29, which latter is suitably engaged with the adjacent arms 17 so that the action of the coil springs 28 normally pulls the door 16 away from the opening 9. When the door 16 is closed the steam pressure in the casing 1 acts upon the concave side of the door 16 and presses the door 16 against the packing strips 24. When the pressure is released or a slight vacuum is created in the casing 1, then the atmospheric pressure as well as the action of the spring 28 shifts the door 16 away from the packing strips 24. Atmospheric air thus admitted into the casing 1 equalizes the pressure on the opposite sides of the door 16 and thereby facilitates the turning of the door.

The door 16 is held in position by a clamping device denoted in its entirety by the numeral 31. This clamping device includes a pivoted clamp bar 32. This bar 32 in the present arrangement is pivoted at its lower end and has its upper end bearing against the front wall 7 above the opening 9. Through a central hub 33 of the clamp bar 32 is extended a threaded shaft 34 on the inner end of which is a hook 36 for engagement with a cross bar 37 in a recess 38 formed in about the center of the door 16. A hand wheel 39 is threadedly engaged with the threaded shaft 34 and operates as a tightening nut bearing against the outer surface of the clamp hub 33. When the door 16 is in the closing position, the hook 36 is engaged with the cross bar 37 and the hand wheel 39 is tightened, bearing against the clamp bar 33 and tightly pulling the door 16 against the packing strips 24. In order to release the door 16 the hand wheel 39 is loosened and the hook 36 is disengaged from the cross bar 37 of the door 16. Then the clamp bar 32 can be swung into an out of the way position, permitting access through the opening 9. The hole 41 in the hub 33 of the clamp bar 32 is tapered and is larger than the threaded shaft 34 so as to allow the swinging of the hook 36 into and out of engagement with the cross bar 37.

Figure 4:
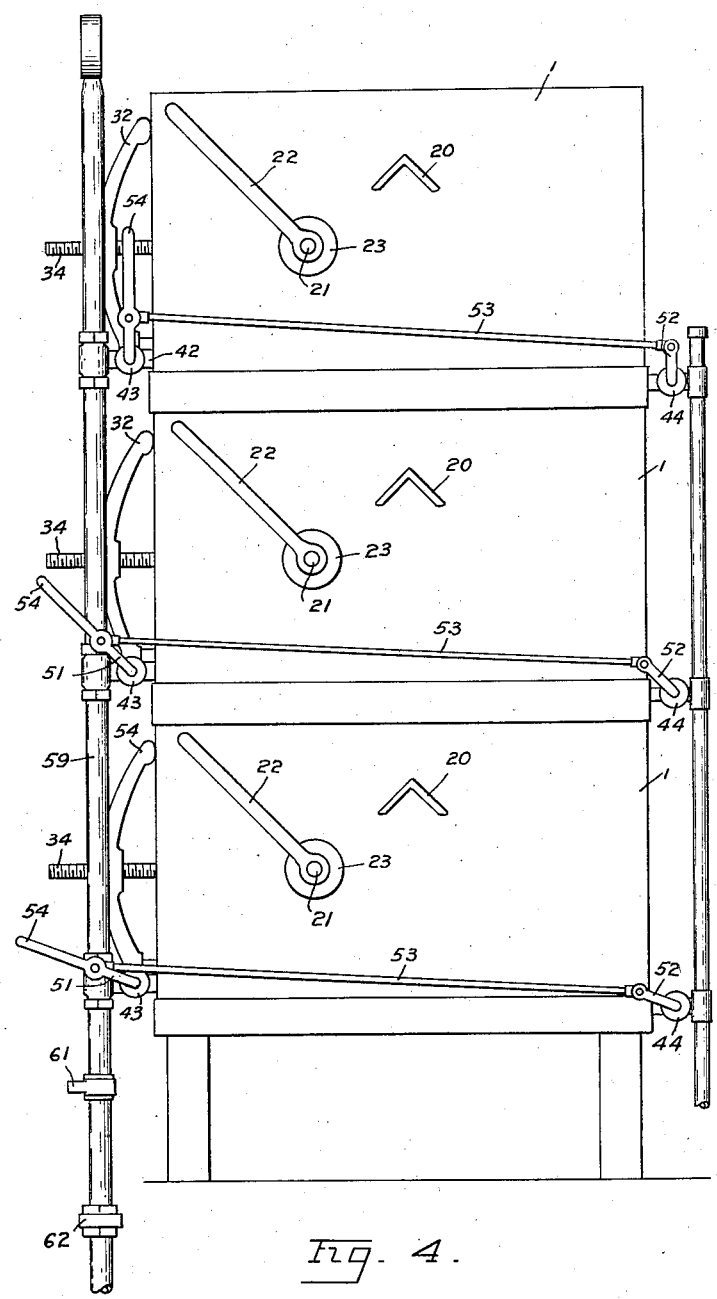
Fig. 4 is a side view of my cooker.

A steam intake 42 is provided, in the herein illustration, at the lower portion of the front wall 7 near one of the side walls 3 of the box 1. The intake 42 is controlled by a suitable intake valve 43. The exhaust passage 8 is controlled by suitable exhaust valve 44. The operation of the intake valve 43 and of the exhaust valve 44 is coordinated, and the operation of both valves is also coordinated with the operation of the clamping bar 32. The coordination between the intake valve 43 and the exhaust valve 44 is for the purpose of simultaneously adjusting both valves to certain conditions in the operation of the pressure cooker. In the present illustration the valves 43 and 44 are of the cock valve type, wherein the cock valves 46 and 47, respectively, have their passages 48 and 49 at right angles to one another. In other words as shown in Fig. 6 when the cock valve 46 of the intake valve 43 is fully open, then the cock valve 49 of the exhaust valve 49 is fully closed. Relative movement of the valves is accomplished by the arrangement of valve levers 51 and 52, respectively operating the cock valves 46 and 47. For simultaneous operation the valve levers 51 and 52 are connected by a link 53. The valve lever 51 on the intake valve 43 is provided with a handle 54 for the manipulation of the valves. When the handle 54 is pulled forward into the position shown in the lowest pressure cooker unit in Fig. 4, then the intake valve 43 is fully closed, and the exhaust valve is fully open. This is the position where the door of the pressure cooker can be opened and shut at will and food can be placed into or removed from the casing 1. After the door 16 is closed and clamped in position, the handle lever 54 is moved into the position shown in the middle unit in Fig. 4 and in Fig. 7. In this intermediate position both the intake valve and the exhaust valve are partly open. Thus in the beginning of the operation steam is admitted into the casing 1 and the trapped air is rapidly expelled from the casing 1. Thereafter, the handle 54 is moved into the position shown on the top unit of Fig. 4 and Fig. 6, in which position the intake valve 43 is fully open and the exhaust valve 44 is fully closed allowing the building up of a suitable steam pressure in the pressure cooker.

Figure 3:
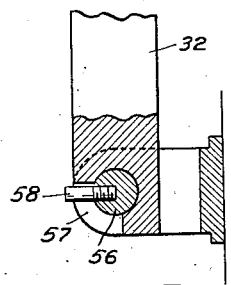
Fig. 3 is a sectional fragmental detail of the connection of the clamp to the valve control shaft.

The operation of the valves 43 and 44 is also coordinated with the opening of the clamping device 31. As shown in Fig. 3, the clamping bar 32 is pivoted at its lower end on a cross shaft 56. This cross shaft 56 is suitably journalled on the front wall 7 of the casing 1 and it operates also as the valve shaft for the turning of the intake valve 43. The turning movement of the shaft 56 is transmitted through the valve levers 51 and 52 and the link 53 to the exhaust valve 44. In the pivoted end of the clamping bar 32 is a slot 57 which is concentric with the shaft 56. An abutment screw 58 extends from the shaft 56 and through said slot 57. The abutment screw 58 extends horizontally and adjacent the upper end of the slot 57 when the intake valve 43 is open. When the clamping bar 32 is opened the upper end of the slot 57 abuts against the screw 58 and turns the shaft 56 in a counter-clock-wise direction as shown in Fig. 3, thereby shutting off the valve 43. In this manner the opening of the door while the steam is still on is prevented, because the turning of the clamping bar 32 automatically shuts off the steam. The reverse operation protects against the turning on of the steam without clamping the door, namely, when the valve 43 is turned to open position, it lifts the clamping bar 32 therewith, thus indicating that the door should be clamped closed before steam is admitted. The swinging of the clamp 32 into open position will not only shut the intake valve 43 but will also open the exhaust valve through the link 53 so that the steam is exhausted from the casing 1. For further safety against accumulation of excessive pressure in the intake pipe 59 a safety or pop valve 61 is interconnected in the intake pipe beyond the usual check valve indicated at 62.

In operation the clamping device 31 is opened and the door 16 is swung into the upward opening position above the center of the pivot shaft 21 and it is held in that position by the engagement of the handle 22 with the abutment 20. A tray or vessel containing the food to be cooked is then inserted through the opening 9 and placed upon the perforated shelf 12. During this time the lever 54 is in the position shown in the lowest unit in Fig. 4, and the intake valve 43 is closed and the exhaust valve 44 is open. After the food is in the casing 1, the operator, by turning the handle 22, swings the door 16 down into the closed position shown in Fig. 5. The friction in the packings 24 as well as the action of the coil spring 28 holds this balanced door in alignment with the opening 9. Then the clamp bar 32 is swung into the clamping position shown in Fig. 5, the hook 36 of the shaft 34 is engaged with the cross bar 37 in the door 16, and the hand wheel 39 is tightened so as to center the door 16 and draw it against the compressible packing strips 24. Then the valve lever 54 is turned to the position shown in the second unit in Fig. 4, and the valves are thus turned into the position illustrated in Fig. 7, namely, both the intake and exhaust valves are partly open. Steam now is admitted into the casing 1 for expelling the air through the partly open exhaust valve 44. Then the valve lever 54 is turned into the vertical position shown in the top unit of Fig. 4 and this will completely open the intake valve 43 and close the exhaust valve 44 as illustrated in Fig. 6. Steam is now freely admitted into the casing 1 under cooking pressure. This steam pressure in the casing 1 bears against the concave side of the door 16 and presses the door against the packing strips 24 for tight sealing of the pressure cooker. The food is left in the cooker for a desired period. Then the handle 54 is turned into the initial position, closing the intake valve and opening the exhaust valve. This assists in quickly exhausting the steam pressure from the cooker. Then the clamping device 31 is loosened, disengaged from the door, and finally the door is swung again into open position. The door can be easily opened at this time because there is no steam pressure behind the door 16 and the coil spring 28 pulls the door away from the inner ends of the flanges 11. The cooked food can now be removed and the pressure cooker is ready for another operation. In the event the operator does not shut off the steam, and attempts to open the door, then the swinging of the clamping bar 32 downwardly operates to automatically shut off the steam as the clamping bar 32 is swung open, thereby reducing the steam pressure behind the door and allowing the exhaust of the steam from the cooker before the door is opened.

The pressure cooker herein described may be made in single units or in multiple units. The features of this invention may be incorporated in pressure cookers which are heated on a stove, or in units where outside steam supply is provided, or in units where a steam generator is furnished with the pressure cooker.

I claim:

1. In a pressure cooker a box having an inlet opening on one side thereof, an arcuate door in the inside of said box, an arcuate seat on the inside of said opening conforming to the face of said door, the concave face of said arcuate door facing inwardly from the box to be pressed by the pressure in the box and toward said seat, and mounting means inside of the box to swingably support said door and to transmit swinging movement to said door toward to and away from said opening, said door mounting means including pivot shafts journaled in the box, mounting arms extended from the concave side of said door being slidably held on said pivot shafts and for rotation with said pivot shafts, resilient elements connected to said pivot shafts and to said arms to normally pull said arms and said door away from said opening and towards said pivot shaft, and a handle on the outside of one of said pivot shafts for the manipulation of said door.

2. In a pressure cooker of the character described, a box, said box having an inlet opening through one side thereof, a door of arcuate cross section inside of said box, a seat for the door formed inside of said opening and conforming to the convex outline of said door, the concave side of said door facing inwardly of the box arms extended from the concave side of said door, pivoting means journaled in the box substantially centrally to the arc of said door cross section hubs formed on said arms and connected for rotation with said pivoting means, said hubs being slidable relatively to said pivoting means transversely to the pivot axis, packing strips between said seat and said door, and means outside of the box for turning said pivoting means and said door.

3. In a pressure cooker of the character described, a box, said box having an inlet opening through one side thereof, a door of arcuate cross section inside of said box, a seat for the door formed inside of said opening and conforming to the convex outline of said door, the concave side of said door facing inwardly of the box arms extended from the concave side of said door, pivoting means journaled in the box substantially centrally to the arc of said door cross section, hubs formed on said arms and connected for rotation with said pivoting means, said hubs being slidable relatively to said pivoting means transversely to the pivot axis, packing strips between said seat and said door, and means outside of the box for turning said pivoting means and said door, a clamping element pivoted on the outside of said box and swingable across said opening at will, a hook on said clamping element, an engagement member on said door to be engaged by said hook, and means to draw said hook towards said clamping element for clamping the door in closed position.

4. In a pressure cooker of the character described, a box, said box having an inlet opening through one side thereof, a door of arcuate cross section inside of said box, a seat for the door formed inside of said opening and conforming to the convex outline of said door, the concave side of said door facing inwardly of the box arms extended from the concave side of said door, pivoting means journaled in the box substantially centrally to the arc of said door cross section, hubs formed on said arms and connected for rotation with said pivoting means, said hubs being slidable relatively to said pivoting means transversely to the pivot axis, packing strips between said seat and said door, and means outside of the box for turning said pivoting means and said door, the arc of said door and its radial spacing from said pivot axis being smaller than the distance of the pivot axis from another side of the box to permit the door to be swung into out-of-way position, and resilient elements connected between said pivoting means and said arms for normally urging said door towards said pivot axis.

WILLIAM A. PLEDGER.

(References on following page)

REFERENCES CITED

The following references are of record in the file of this patent:

UNITED STATES PATENTS

| Number | Name | Date |
|---|---|---|
| 504,356 | Love | Sept. 5, 1893 |
| 941,531 | Oldman | Nov. 30, 1909 |
| 1,015,847 | Shields | Jan. 30, 1912 |
| 1,354,519 | Soerensen | Oct. 5, 1920 |
| 1,503,363 | Hall | July 29, 1924 |
| 1,621,736 | Middleton | Mar. 22, 1927 |
| 2,060,434 | Vincent | Nov. 10, 1936 |
| 2,124,349 | Herbster | July 19, 1938 |
| 2,218,263 | Lewis et al. | Oct. 15, 1940 |
| 2,247,509 | Lebus | July 1, 1941 |
| 2,296,313 | Shields | Sept. 22, 1942 |
| 2,373,620 | Vischer, Jr. | Apr. 10, 1945 |